United States Patent [19]

Reitmeier

[11] Patent Number: 4,843,485
[45] Date of Patent: Jun. 27, 1989

[54] MULTIPLE FORMAT DIGITAL VIDEO TAPE RECORD AND REPLAY SYSTEM

[75] Inventor: Glenn A. Reitmeier, Trenton, N.J.

[73] Assignee: General Electric Company, Schenectady, N.Y.

[21] Appl. No.: 920,896

[22] Filed: Oct. 16, 1986

Related U.S. Application Data

[63] Continuation of Ser. No. 564,832, Dec. 23, 1983, abandoned, which is a continuation of Ser. No. 311,796, Oct. 15, 1981, abandoned.

[51] Int. Cl.$^4$ .............................................. H04N 5/78
[52] U.S. Cl. ................................. 360/9.1; 360/33.1; 358/310; 358/335
[58] Field of Search ................. 358/140, 310, 335; 360/9.1, 33.1, 32, 35.1

[56] References Cited

U.S. PATENT DOCUMENTS

| | | |
|---|---|---|
| 3,359,365 | 7/1965 | Kihara ................................. 358/313 |
| 3,414,684 | 12/1968 | Lichowsky . |
| 3,463,878 | 8/1963 | Nassimbene ........................... 360/84 |
| 3,524,018 | 8/1970 | Kihara . |
| 3,718,755 | 2/1973 | Crosno . |
| 3,944,728 | 3/1976 | Ferrari . |
| 4,041,453 | 8/1977 | Umeda et al. . |
| 4,121,264 | 10/1978 | Kishi et al. . |
| 4,139,873 | 2/1979 | Maxey ................................. 360/85 |
| 4,183,067 | 1/1980 | Kihara et al. ........................ 360/75 |
| 4,263,623 | 4/1981 | Woo et al. ........................... 358/906 |
| 4,274,118 | 6/1981 | Mangold . |
| 4,298,888 | 11/1981 | Colles et al. ........................ 358/140 |
| 4,393,414 | 7/1983 | Reitmeier ........................ 360/38.1 X |
| 4,395,738 | 7/1983 | Hedlund et al. ...................... 360/9.1 |
| 4,463,387 | 7/1984 | Hashimoto et al. .............. 360/22 X |
| 4,641,188 | 2/1987 | Dischert ............................. 358/140 |
| 4,685,002 | 8/1987 | Powers ........................... 360/10.1 X |

FOREIGN PATENT DOCUMENTS

| | | |
|---|---|---|
| 3444A1 | 8/1979 | European Pat. Off. . |
| 59453A1 | 8/1982 | European Pat. Off. . |
| 50-11212 | of 1975 | Japan ................................. 360/84 |
| 50-17801 | of 1975 | Japan ................................. 360/84 |
| 1131273 | 10/1968 | United Kingdom . |
| 1146410 | 3/1969 | United Kingdom . |
| 2027252 | 2/1980 | United Kingdom ............... 360/33.1 |
| 1579780 | 11/1980 | United Kingdom ............... 360/33.1 |
| 2068628 | 8/1981 | United Kingdom ................. 360/70 |
| 2165389A | 4/1986 | United Kingdom . |

OTHER PUBLICATIONS

"ENG System: Portable Camera Revolutonize News Gathering", I. Okada, JEE No. 115, pp. 30, 31, 33, 34, Jul. 1976.

*Primary Examiner*—Aristotelis M. Psitos
*Attorney, Agent, or Firm*—Eugene M. Whitacre; Joseph J. Laks

[57] ABSTRACT

A hierarchy of video standards is provided in a recording format for video record and replay systems to achieve performance flexibility, such as in regard to television studio and portable recording equipment. This recording format divides the tape into a plurality of longitudinal segments with each segment being assigned to tracks in which full raster information is recorded at a fractional resolution equal to the quotient of one divided by the number of the plurality of longitudinal tape segments.

14 Claims, 8 Drawing Sheets

U.S. Patent  Jun. 27, 1989  Sheet 1 of 8  4,843,485
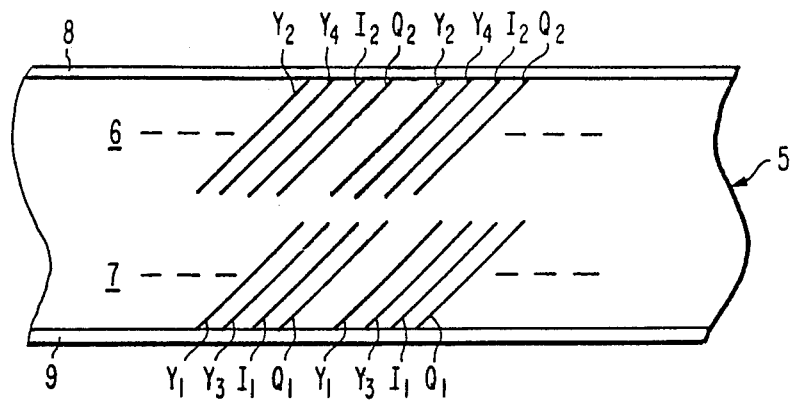
Fig. 1
$Y_1$ $Y_2$ $Y_3$ $Y_4$ $Y_5$ $Y_6$ $Y_7$ $Y_8$ $Y_9$ $Y_{10}$ $Y_{11}$ $Y_{12}$ $Y_{13}$ $Y_{14}$ $Y_{15}$ $Y_{16}$ ....
$I_1$ $Q_1$ $I_2$ $Q_2$ $I_3$ $Q_3$ $I_4$ $Q_4$ $I_5$ $Q_5$ $I_6$ $Q_6$ $I_7$ $Q_7$ $I_8$ $Q_8$ ....
⟶ TIME
Fig. 2
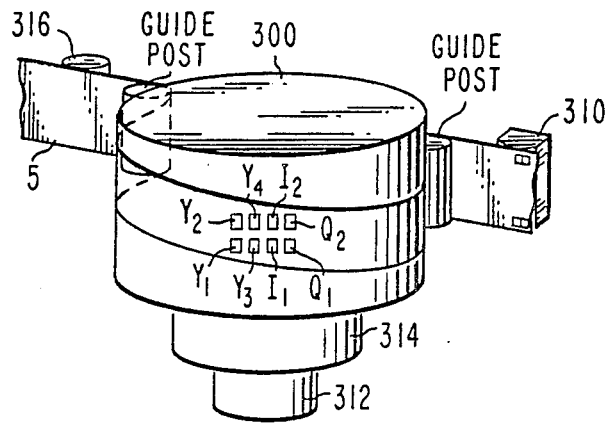
Fig. 3

MULTIPLE FORMAT DIGITAL VIDEO TAPE RECORD AND REPLAY SYSTEM

BACKGROUND OF THE INVENTION

Although many different recording formats are known for use in digital video tape systems which include record and/or replay units, each such system is designed to utilize only one format. Therefore, no compatibility exists between systems having different recording formats because a tape recorded by one system cannot be replayed in another system. If high quality performance is to be attained, a recording format requiring extensive tape consumption and complex signal processing circuitry must be utilized, which then becomes very cumbersome in portable recording equipment. However, simplification of recording format to gain enhanced compactness in portable record equipment by reducing tape consumption and the amount of circuitry, results in reduced performance.

It has been proposed to use a hierarchy of digital television standards wherein a higher data rate system would be available to attain the high quality performance required for studio equipment, and a lower data rate system would be available to attain compactness in portable equipment. One such hierarchy for the Y, I and Q components of a television signal provides for the higher data rate system by sampling the components in the ratio of 4:2:2 respectively, and provides for the lower data rate system by sampling the components in the ratio of 2:1:1 respectively. For example, one currently contemplated standard utilizes a sampling frequency of 13.5 MHz corresponding to the level of 4 in the hierarchy, and therefore the levels of 2 and 1 would represent frequencies of 6.75 and 3.375 MHz, respectively. Although such hierarchies do provide for greater flexibility between studio and portable recording equipment, the individual recording formats for higher and lower data rate systems are not readily interchangeable in that a tape recorded by one system cannot be replayed directly in the other system. To convert the recording format of one system to the recording format of the other system, recorded information sampled at one hierarchy level must be replayed, transcoded into the other hierarchy level and re-recorded or otherwise transmitted around the studio.

SUMMARY OF THE INVENTION

A multiple recording format for a digital video tape record and replay system is provided wherein the tape is laterally divided into a plurality of longitudinal segments with each segment being assigned to tracks in which full raster information is recorded at a fractional resolution equal to the quotient of one divided by the number of the plurality of longitudinal tape segments so different data rates are available for different aspects of the system such as the studio and portable recording equipments respectively.

BRIEF DESCRIPTION THE DRAWINGS

FIG. 1 illustrates an embodiment of a multiple recording format in accordance with the invention;

FIG. 2 illustrates the sequence of Y, I and Q samples that are to be recorded in the tracks of each longitudinal segment of a magnetic tape having the multiple recording format illustrated in FIG. 1;

Figure 4:
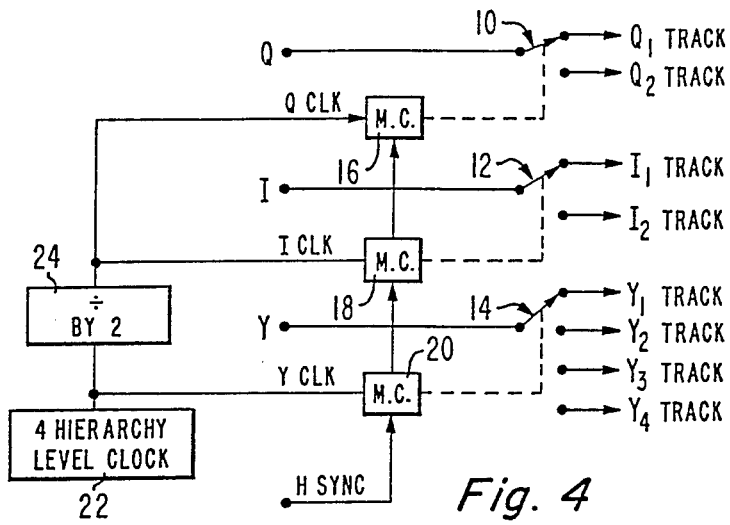
Figure 5:
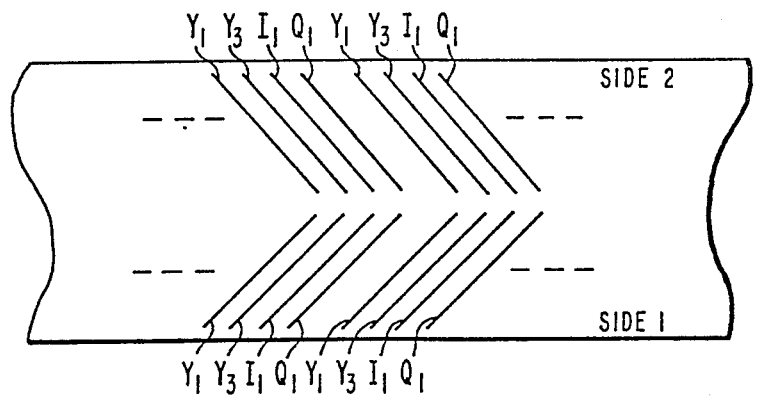
Figure 6:
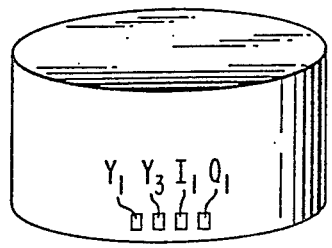
Figure 7A:
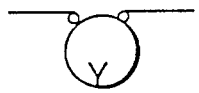
Figure 7B:
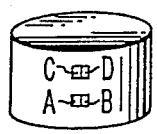
Figure 7C:
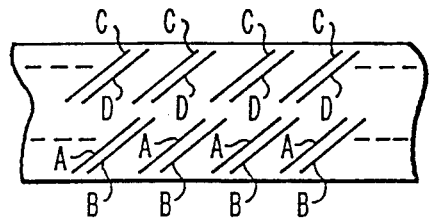
Figure 8A:
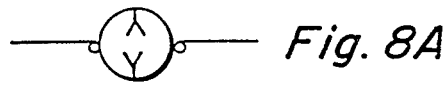
Figure 8B:
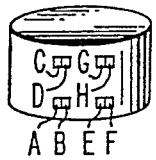
Figure 8C:
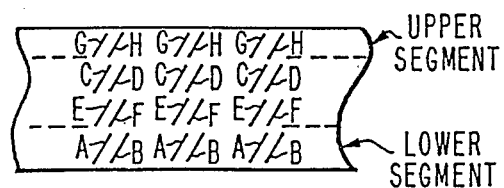
Figure 9:
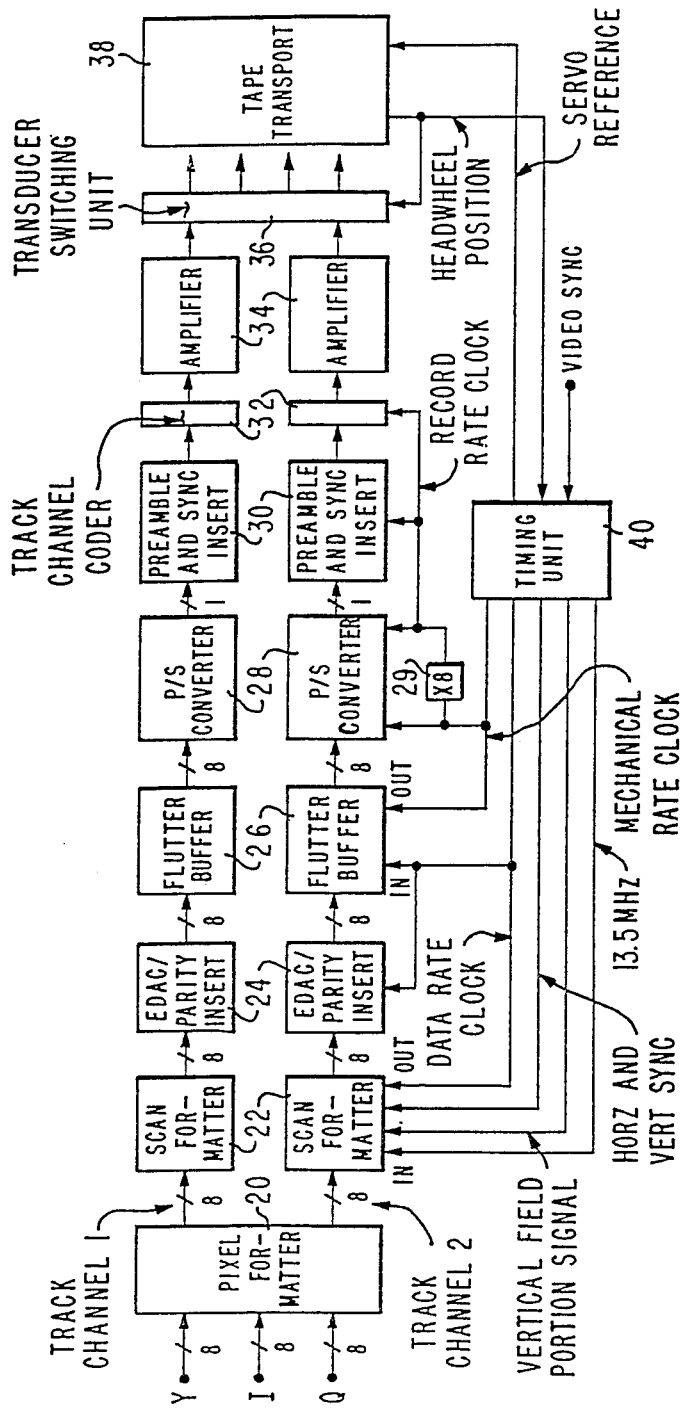
Figure 10:
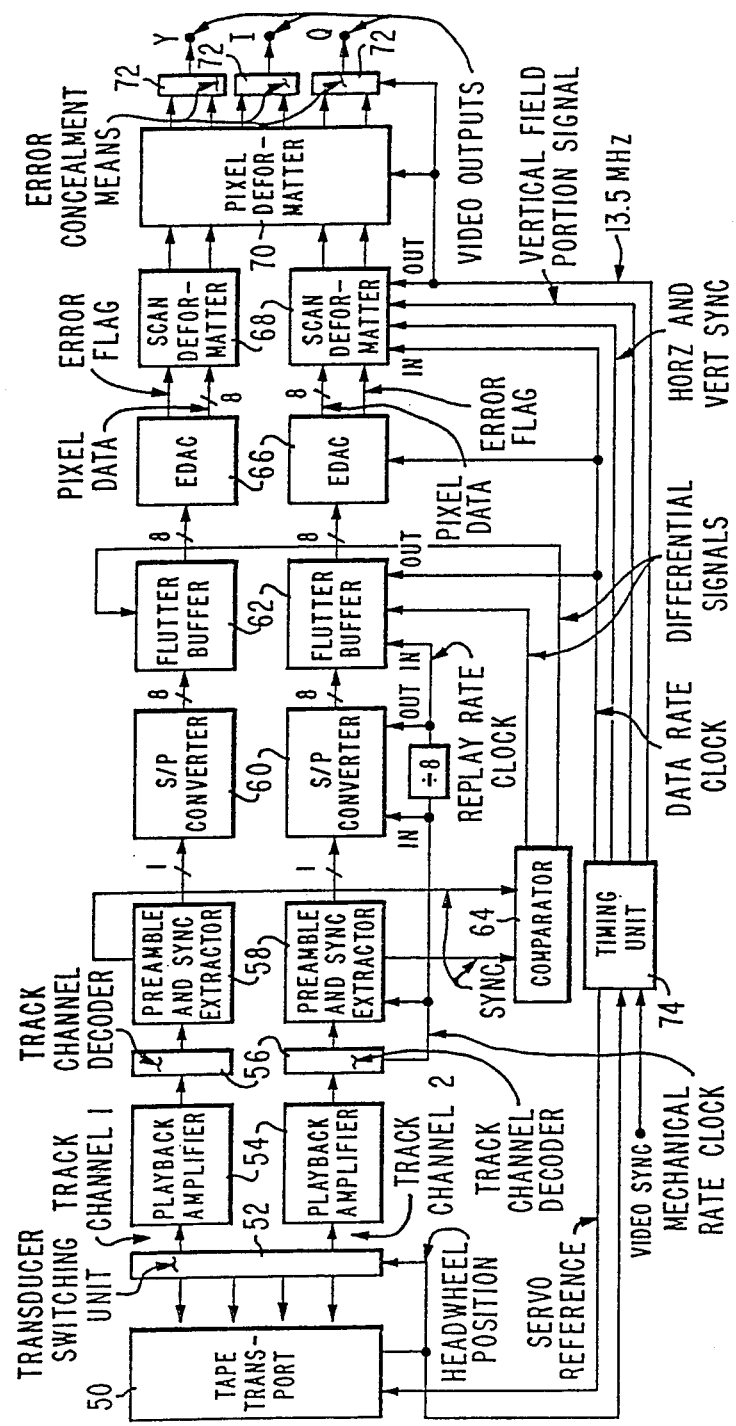
Figure 11:
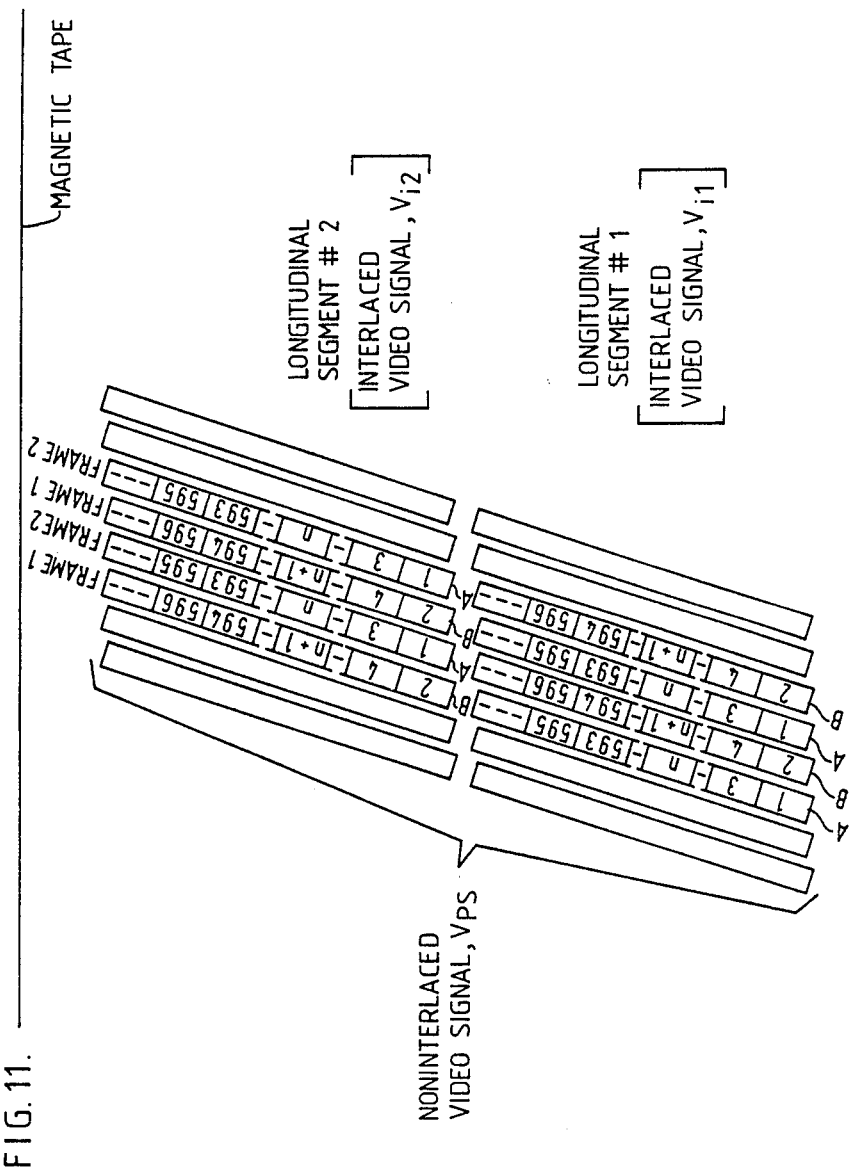
Figure 12:
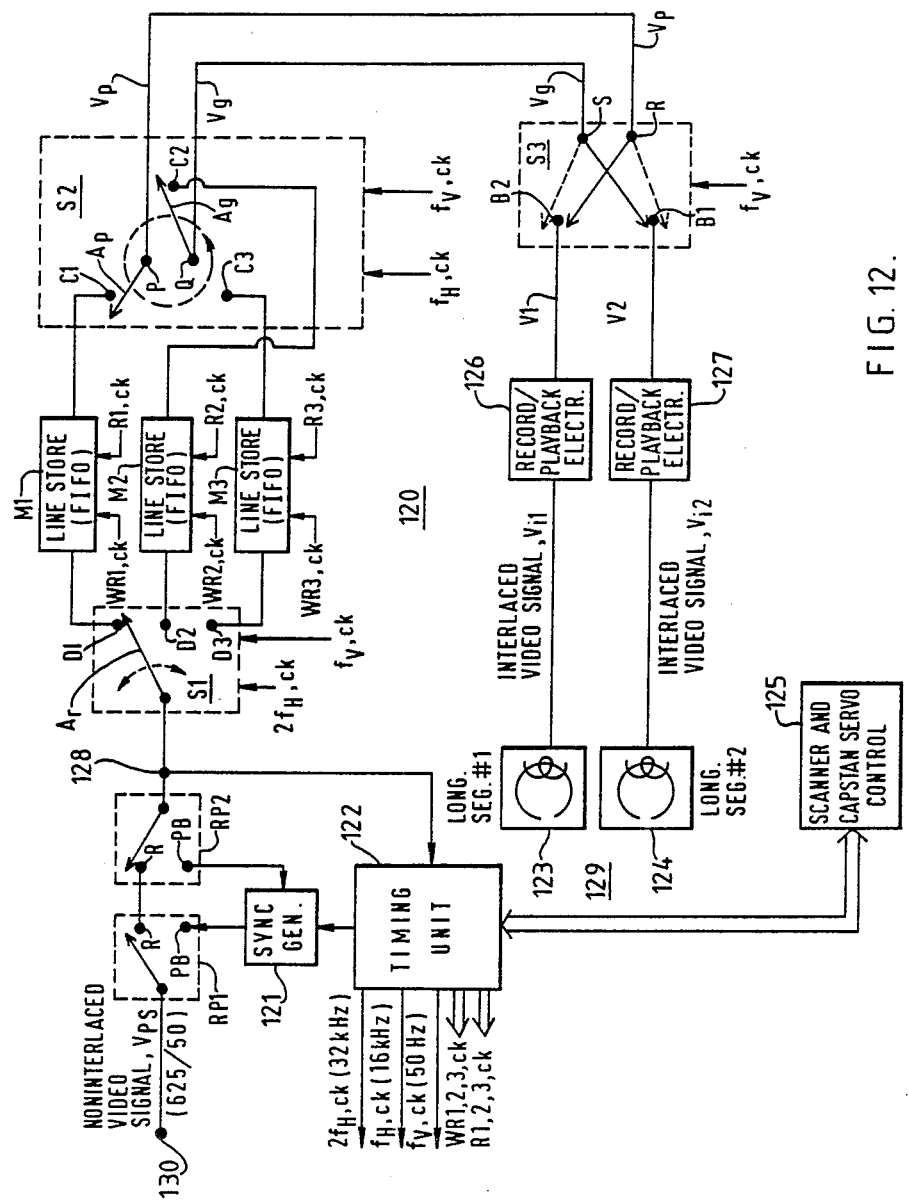

FIG. 3 schematically illustrates scanner apparatus used to scan tracks in accordance with the multiple recording format illustrated in FIG. 1;

FIG. 4 illustrates schematically an arrangement for directing the Y, I and Q component pixels to each of the transducers of FIG. 3;

FIG. 5 illustrates a multiple recording format in accordance with an aspect of the invention that is adapted for use by a portable tape unit;

FIG. 6 schematically illustrates the arrangement of transducers on a scanner of a portable unit adapted for use with a multiple recording format in accordance with an aspect of the invention;

FIG. 7A illustrates a tape wrap and FIG. 7B illustrates the locations of transducers on a scanner so as to scan tracks in accordance with the multiple recording format illustrated in FIG. 7C;

FIG. 8A illustrates a tape wrap and FIG. 8B illustrates the locations of transducers on a scanner so as to scan tracks in accordance with the multiple recording format illustrated in FIG. 8C;

FIGS. 9 and 10 illustrate record and replay pixel reformatting systems, respectively, adapted for use with the recording formats of FIGS. 1, 5, 7C and 8C;

FIG. 11 illustrates another embodiment of a multiple recording format in accordance with an aspect of the invention;

FIG. 12 illustrates, in block diagram form, a record/playback system capable of recording and playing back a television signal in accordance with the format illustrated in FIG. 11; and FIG. 13A–13I illustrate a timing diagram useful in explaining the operation of the system of FIG. 12.

DESCRIPTION OF THE PREFERRED EMBODIMENTS

In digital video tape record and replay systems, the recorded information is commonly related to each picture (e.g. television field or frame) by a grid of samples that are to be displayed in a raster. To provide for greater compactness in portable equipment while allowing for quality performance with studio equipment, a multiple recording format is disclosed for a digital video tape record and replay system. In this multiple recording format, the tape is laterally divided into a plurality of longitudinal segments with each segment being assigned to record full raster information at a partial or fractional pixel resolution equal to the quotient of one divided by the number of the plurality of longitudinal tape segments. The video is first digitized by sampling pixels (picture elements or samples) at some predetermined frequency and these pixels may relate to either composite or component video information. Each pixel is directed through a transducer to a particular track in one of the longitudinal segments and such tracks may be disposed in each segment along the direction of tape travel or at some angle across the direction of tape travel.

One preferred embodiment of a multiple recording format in accordance with the invention is illustrated by FIG. 1 wherein Y, I and Q components of the video information are being recorded. The longitudinal tracks 8, 9 containing e.g. audio and cue in FIG. 1 are scanned on tape 5 by fixed transducer head 310 in FIG. 3. The Y, I, and Q components are sampled in a conventional ratio of 4:2:2 respectively, as illustrated in FIG. 2 for one raster scan line. Furthermore, the tape 5 is divided into just two longitudinal segments 6 and 7 and full raster information at one-half resolution is recorded in each longitudinal tape segment. Therefore, two Y tracks, one I track, and one Q track are disposed in 4-track sections of each longitudinal segment and each of these tracks are scanned across the direction of tape travel in a helical pattern. As shown in FIG. 3, each track in the 4-track sections is scanned simultaneously by separate transducers $Y_1$, $Y_2$, $Y_3$, $Y_4$, $I_1$, $I_2$, $Q_1$, and $Q_2$ on a rotating scanner 300 driven by a motor 312 and drive 314. The tape is translated across the face of headwheel 300 by a drive including capstan 316 in an arrangement familiar to those skilled in the art. Because the transducers are located under the tape 5 in FIG. 3, they should be represented with discontinuous or dash lines but due to their small size, they are represented with continuous lines in the interest of clarity. A tape wrap of approximately 270° is shown in FIG. 3. However, any wrap angle could be utilized, even an omega wrap of substantially 360°. Furthermore, each 4-track section could include information relating to a field or frame in a format familiar to those skilled in the art. For every raster scan line of video information, track $Y_1$ contains Y pixels 1, 5, 9, 13 and so on; track $Y_2$ contains Y pixels 2, 6, 10, 14, and so on; track $Y_3$ contains Y pixels 3, 7, 11, 15, and so on; track $Y_4$ contains Y pixels 4, 8, 12, 16, and so on; track $I_1$ contains I pixels 1, 3, 5, 7, and so on; track $I_2$ contains I pixels 2, 4, 6, 8, and so on; track $Q_1$ contains Q pixels, 1, 3, 5, 7, and so on; track $Q_2$ contains Q pixels, 2, 4, 6, 8, and so on. With this recording format, the video information can be recorded at full resolution on both longitudinal segments of the tape with a studio record unit for which compactness and portability are not a primary concern or at one-half resolution on only one longitudinal segment of the tape with a portable record unit for which compactness and portability are a primary concern.

To record the video information at half resolution in the separate longitudinal tape segments, the Y, I and Q components could be organized in many ways other than the way described above regarding FIG. 1. For example, the video information relating only to the odd numbered raster scan lines could be recorded in one longitudinal tape segment while the video information relating only to the even numbered raster scan lines could be recorded in the other longitudinal tape segment. Also, the video information relating only to the odd numbered fields could be recorded in one longitudinal tape segment while the video information relating only to the even numbered fields could be recorded in the other longitudinal tape segments. Furthermore, the inventive concept disclosed in the Applicant's U.S. Patent Application Ser. No. 241,925, dated Mar. 9, 1981 and entitled "Interleaved Recording Format for Digital Video", now U.S. Pat. No. 4,393,414, could be incorporated along with the concept of this invention by recording each of the interleaved checkerboard pixel patterns illustrated in FIG. 1 of the prior application, in the separate longitudinal tape segments in FIG. 1 of this application.

As explained previously in regard to FIG. 3, those skilled in the art will readily understand that a separate transducer would be required on the rotating scanner 300 for each of the $Y_1$, $Y_2$, $Y_3$, $Y_4$, $I_1$, $I_2$, $Q_1$, and $Q_2$ tracks in the helical pattern of FIG. 1. An arrangement for directing the Y, I and Q component pixels to each of the transducers on this scanner 300 is shown in FIG. 4. Because the particular recording format selected could have any number of tracks allotted to each of the Y, I and Q components, this arrangement will be described for both the 4:2:2 recording format of FIG. 1 and the general situation wherein the number of different tracks is not limited. The pixels of each signal component are directed to individual switches 10, 12 and 14 which relate to the Q, I and Y components respectively. While the switches 10, 12 and 14 are illustrated as mechanical switches, it will be readily understood that equivalent electronic swithches would be utilized in practice. Each switch 10, 12 and 14 has a number of output throw positions equal to the number of format tracks that are allotted to its signal component. Each output from the switches 10, 12 and 14 is directed in known fashion to a track on the recording medium through one of the transducers shown in FIG. 3. The throw positions of switches 10, 12 and 14 are each controlled individually by the output count of modulo counters 16, 18 and 20 respectively. Each modulo counter 16, 18 and 20 has a number of count outputs equal to the number of format tracks that are allotted to the signal component of the switch 10, 12 or 14 it controls and also, a programmable starting count output when the nature of the particular format selected so requires. Because the Q and I components are each allotted only one track in the 4-track sections of each longitudinal tape segment in the FIG. 1 recording format, the modulo counters 16 and 18 coulb be flip flops in this hardware arrangement. Each modulo counter 16, 18 and 20 is driven by the pixel rate clock of the signal component to which its switch 10, 12 or 14 respectively, relates. As an example, a clock 22 representative of the frequency (13.5 MHz) corresponding to the "4" hierarchy level, is directly applied to drive modulo counter 20. Clock 22 is applied through a divide-by-2 unit 24 thus deriveing the "2" level frequency required to drive modulo counters 16 and 18. Modulo counter 20 is of the programmable starting count type. The horizontal sync signal is applied to the starting count input of each modulo counter 16, 18 and 20, so that the recording of each raster scan line will start with the first Y pixel in that line. Each switch 10, 12 or 14 is set to a different track position for each output count of its respective modulo counter 16, 18 or 20 and the Y, I and Q component pixels are thereby directed to their designated tracks in the different longitudinal tape segments. It will also be readily understood by those skilled in the art that the switching arrangement for replaying a particular recording format embodiment is essentially the inverse of the particular switching arrangement selected for recording that format and therefore, such replay switching is not shown in the interest of brevity. Consequently, the replay switching arrangement for the record switching arrangement of FIG. 4 would include a separate switch to receive each of the Y, I and Q component pixels through a transducer from the tape tracks and a modulo counter to control each switch in reconstructing the appropriate replay signal therefrom. Of course, the modulo counters would be driven by the horizontal sync signal and clocking arrangement in a manner similar to that shown in FIG. 4.

Of course, the replay unit of the system must be capable of reproducing the video information as a signal for display from either the full or half resolution recording formats on the tape in FIG. 1. Certainly those skilled in the art will understand that the full resolution format presents no problem because the replay unit would only perform the inverse functions of the record unit in reverse order. Therefore, transducers in the replay unit would pick up all of the video information from the tracks in both longitudinal segments of the tape and process that information in a well known conventional manner to derive the display signal. With this invention, the replay unit can also reproduce the one-half resolution format from one longitudinal segment of the tape in this same way where the picture obtained from the display signal would be acceptable, such as in ENG applications, even though it would not be of suitable quality for most studio purposes. However, in the concept of a digital video hierarchy, the lower quality level signal may be transcoded to a higher quality level by using well known error compensation or concealment techniques such as the interpolation scheme disclosed in U.S. Pat. No. 4,041,453. Thus, a hierarchy transcoder could be incorporated into the replay unit (either separately or as part of the concealment system) to process the one-half resolution video information in deriving a display signal of suitable quality for most studio purposes. Other design approaches to such a hierarchy transcoder are discussed in John P. Rossi's article entitled "A Simple Family of Digital Filters For A Binary Hierarchy" in the October 1981 SMPTE Journal, pages 956-959.

When a portable unit is utilized to record the video information at one-half resolution on only one longitudinal segment located toward one side of the tape in FIG. 1, the other longitudinal segment located toward the other side of the tape remains blank. To fully utilize the tape deck and thereby enhance the functional aspect of the portable record unit, this blank portion of the tape deck is also recorded with video information at one-half resolution in another prefered embodiment of the invention which is illustrated in FIG. 5. Each longitudinal segment of the tape is independently recorded or replayed in this embodiment while the tape travels through its full length and after the longitudinal segment located toward one side of the tape has been recorded or replyed, the tape is "flipped" and fed in the reverse direction to record or replay the video information in the longitudinal segment located toward the other side of the tape. Therefore, the tracks in each longitudinal segment of FIG. 5 recording format traverse the tape in different directions. However, the tape deck could be rewound between the recording or replaying of the video information in each of its longitudinal segments as still another embodiment of the invention, so that the tracks in each longitudinal segment would traverse the tape in the same direction. Furthermore, component video information is also illustrated in the recording format of FIG. 5 for illustrative purposes only and composite video information at one-half resolution could readily have been recorded or replayed in substantially the same format.

Since recording format embodiments of the invention, such as that shown in FIG. 5, only relate to partial raster resolution, the number of transducers on the scanner can be reduced in the equipment of the record and replay system that operates with only those recording formats. An example of such equipment would be a portable record unit or an electronic news gathering (ENG) television recorder and a scanner for either recording or replaying the format of FIG. 5 in such equipment, is illustrated in FIG. 6. Of course, a switching arrangement in accordance with the previous discussion regarding FIG. 4 would be utilized to direct the Y, I and Q component pixels to or from each of the transducers on the scanner during the record or replay modes, respectively.

Although only two longitudinal tape segments are included in the multiple recording formats of FIGS. 1 and 5, more of such segments could be included in other formats within the scope of this invention. The transducers can also be arranged in different ways on the scanner to derive the various formats and the video information may be arranged in different ways for each such format. Examples of some of the other formats within the scope of the invention are illustrated in FIGS. 7 and 8 wherein only one of the possible tape wraps around the scanner and the transducer arrangement on the scanner is shown for each format. For the format of FIG. 7C, tandem transducer pairs A, B and C, D are disposed at a single location on the circumference of the scanner as shown in FIG. 7A and are separated across the axial length of the scanner by a distance equal to approximately half that length as shown in FIG. 7B. The transducers of each tandem pair scan separate tracks in the longitudinal tape segments on the tape which is wrapped around the scanner for approximately 346°. For each revolution of the scanner, each tandem transducer pair scans tracks in a separate longitudinal track segment with tracks A and B disposed in one longitudinal tape segment and tracks C and D disposed in another longitudinal tape segment. For the format of FIG. 8C, tandem transducer pairs A, B and C, D are disposed at a first location on the circumference of the scanner, while tandem transducer pairs E, F and G, H are disposed at a second location on the circumference of the scanner that is 180° from the first location, as shown in FIG. 8A. Tandem transducer pair A, B is separated across the axial length of the scanner from tandem transducer pair C, D by a distance equal to approximately one-half of that axial length, while tandem transducer pair E, F is separated across the axial length of the scanner from tandem transducer pair G, H by a distance equal to approximately one-half of that axial length, as shown in FIG. 8B. Tandem transducer pairs E, F and G, H should be shown with dotted lines however, due to their small size they are shown with solid lines for the sake of clarity. The transducers of each tandem pair scan individual tracks in 2 longitudinal segments on the tape which is wrapped around the scanner for 180°. During the initial 180° of each scanner revolution, tandem transducer AB first scans tracks A and B in the lower longitudinal tape segment and thereafter tandem transducer CD scans tracks C and D in the upper longitudinal tape segment, as shown in FIG. 8C. Then during the final 180° of each scanner revolution, tandem transducer EF first scans tracks E and F in the lower longitudinal tape segment and thereafter tandem transducer GH scans tracks G and H in the upper longitudinal tape segment.

The recording formats of this invention could be utilized in otherwise conventional record and/or replay systems, such as the record system shown in FIG. 9 and the replay system shown in FIG. 10. Both of these systems could have any desired number of track channels, however two track channels 1 and 2 were selected for purposes of illustrative convenience.

In the record system of FIG. 9, the digitized Y, I and Q components of the video signal are each applied to the individual inputs of a pixel formatter 20 arranged in accordance with FIG. 10 of my patent application Ser. No. 241,925 dated Mar. 9, 1981, now U.S. Pat. No. 4,393,414. The Y clock in formatter 20 is 13.5 MHz while the I and Q clocks are 6.75 MHz. For illustrative purposes only, and 8 bit parallel format is utilized at each input to the formatter 20. The hardware arrangement illustrated in FIG. 4 could serve as a pixel formatter having individual inputs for each of the Y, I and Q components in a record system with 4 track channels directed to each longitudinal tape segment. However, it should also be understood that the record system of FIG. 9 could only have 2 inputs with the Y components applied at one input and both the I and Q components applied at the other input. In such a system, multiplexing circuitry in the pixel formatter would provide the necessary interface standard. The pixel formatter 20 distributes preselected combinations of Y and/or I and/or Q pixels to a tape scan formatter 22 in each track channel. Control signals including 13.5 MHz clock at the input, horizontal and vertical sync, a vertical field portion signal V/5 or V/6 (intended to accommodate 5 revolutions/field in 525 line TV systems and 6 revolutions/field in 625 line TV systems respectively), and a video data rate (11.8 MHz) clock at the output are applied to each tape scan formatter 22 which functions to convert from the video rate to the tape data rate, while leaving appropriate "blanks" for DVTR overhead. For purposes of illustrative convenience, all such control signals are only shown to be applied in track channel 2 and it should be realized that such signals would also be applied in track channel 1. As is well known in the art, the video data rate (11.8 MHz) clock is determined in accordance with the information rate of the active picture, plus the rate of the digital sync, plus the parity rate; and the horizontal and vertical sync redundancies are removed therefrom. The pixel combinations pass from the scan formatter 22 in each track channel to an error detection and correction (EDAC)/parity insert unit 24 which inserts computer redundancy for purposes of correcting or detecting errors in the recording or playback process, thus accounting for some of the DVTR overhead. The data rate clock is applied to control the passage of pixel combinations through the EDAC/parity insert unit 24. Then in each track channel, the pixel combinations pass from the EDAC/parity insert unit 24 to a flutter buffer 26 which accommodates or corrects any time-base error (TBE) in the mechanics of the record system relative to the video information being recorded. As is known to those skilled in the art, the flutter buffer 26 includes a memory of sufficient capacity to accommodate the TBE. This memory has the data rate (11.8 MHz) clock which is syncronous with the incoming video, controlling its input and a mechanical rate (11.8 MHz) clock which is synchronous with the tape transport, controlling its output. The parallel format of the pixel combinations in each track channel is then changed to serial format through a converter 28 having the mechanical rate clock applied both directly to control its input and through a multiply by 8 unit 29 as a record rate clock to control its output. From the converter 28, the pixel combinations pass to a preamble and sync insert unit 30 which functions to establish both the start of scan information and a digital sync occupying some number of blocks per line. The record rate clock is applied to control the passage of pixel combinations through the preamble and sync insert unit 30. The pixel combinations in each channel pass from the preamble and sync insert unit 30 to a track channel coder 32 which functions to organize the raw digital information in accordance with the tape recording code to be utilized. The record rate clock is applied to control the passage of information through the track channel coder 32. This information in each channel then passes from the coder 32 through a conventional recording amplifier 34 to a transducer switching unit 36 to which a position signal is applied from a rotating headwheel within a tape transport 38. Some number of transducers (such as 4 single transducers at the same locations as the 4 tanden transducer pairs in FIG. 8B to only scan tracks A, E, C, G in FIG. 8C) are disposed on the headwheel for directing the information to the tape traveling through some wrap angle about the headwheel in the transport 38. A servo reference signal is applied to the transport 38 by a timing unit 40 to which the video sync and headwheel position signals are applied and from which all of the clocks, sync signals and vertical field portion signals are supplied.

As mentioned previously, the replay system performs the inverse functions of the record system in reverse order. Therefore, in the replay system of FIG. 10, the recorded information on the tape traveling about a headwheel in a tape transport 50 is picked up in serial format by some number of transducers (four as in the record system of FIG. 9) which are disposed on the headwheel. A transducer switching unit 52 distributes this information to a playback amplifier 54 in track channels 1 and 2. A position signal is applied from the headwheel to the switching unit 52. Each amplifier 54 passes the information in each track channel to a track channel decoder 56 which functions to derive raw digital information and generate a mechanical rate clock synchronous with the transport 50. The raw digital information (still in serial format) in each track channel then pass to a preamble and sync extractor 58 wherein the start of scan information and digital sync information is removed. The mechanical rate clock is applied to control the passage of information through the preamble and sync extractor 58. In each channel, a converter 60 then receives the serial bit stream and changes the serial format to pixel combinations in an 8 bit parallel format. The mechanical rate clock is applied to converter 60 both directly and through a divide by 8 unit 61 as a replay rate (11.8 MHz) clock. The pixel combinations in each channel pass from the converter 60 to a flutter buffer 62 which accommodates or corrects any time-base error (TBE) in the mechanics of the replay system relative to the video information being replayed. This is accomplished by clocking the pixel combinations into the buffer 62 with the replay rate (11.8 MHz) clock and out with a video data rate (11.8 MHz) clock. Also, differential signals from a time comparator 64 are individually applied to each flutter buffer 62. In addition to accommodating the TBE, the flutter buffers 62 respond to the differential signals as programmable delays which accommodate for any timing or mechanical error that may occur between track channels. A sync signal from each preamble and sync extractor 58 is applied to the time comparator 64 and utilized therein to derive the differential signals. The pixel combinations in each track channel pass from the flutter buffer 62 to an EDAC unit 66 which functions to rectify the correctable errors and flag the detectable errors. The data rate clock is applied to control the passage of pixel combinations through the EDAC unit 66. The pixel combinations in each track channel pass from the EDAC 66 to a tape scan deformatter 68 with the detectable error flag being passed in a separate path, such as by using an added bit. The deformatter 68 functions to exclude the overhead "blanks" and convert from the tape rate to the video rate. Control signals including the data rate clock at the input, horizontal and vertical sync, a vertical field portion signal V/5 or V/6, and a 13.5 MHz clock at the output are applied to each deformatter 68. The pixel combinations from the deformatter 68 in each channel pass to a pixel deformatter 70 with the detectable error flag again being passed through a separate path. The deformatter 70 is controlled by the 13.5 MHz clock and functions to collect the pixel combinations from both track channels and directs Y, I and Q pixels to individual video outputs through separate error concealment means 72, such as that disclosed in Applicant's U.S. Patent Application Ser. No. 170,811, filed July 21, 1980, now U.S. Pat. No. 4,376,955, for composite pixel recording and similar techniques to those disclosed therein, could be utilized for component pixel recording. Between the deformatter 70 and each concealment means 72, the detectable error flag also passes through a separate path and the 13.5 MHz clock controls the passage of pixels through each concealment means 72. A servo reference signal is applied from a timing unit 74 to the tape transport 50 and except for the mechanical rate clock and the replay rate (11.8 MHz) clock extracted from the track channel decoder 56, the clocks, sync signals, and field portion signals are also derived from a timing section 74 to which the video sync and headwheel position signals are applied. The pixel deformatter 70 would include identical hardware to that of the pixel formatter 20 in the record system of FIG. 9 however, the switches therein would be connected with multiple inputs from the deformatter 68 and with a single output directed to the video outputs.

FIG. 11 illustrates a multiple segment recording format for recording on a magnetic tape a progressively scanned television signal. The format separates the noninterlaced video lines 1, 2, 3, . . . n . . . of each frame of the progressively scanned television signal into A and B interlaced fields prior to their being recorded in different longitudinal segments. By reversing on a frame-by-frame basis, the recording sequence of noninterlaced video lines that are adjacent in time, the progressively scanned television signal is converted, in each longitudinal segment, into a recorded television signal having interlaced fields that provides a recorded picture scene that is representative of the full picture or the entire area, top and bottom, left and right, of the picture scene contained in the original noninterlaced television signal. Thus in each longitudinal segment of FIG. 11, a frame of the recorded interlaced television signal is comprised of two interlaced fields A and B, recorded in adjacently located helical tracks, with field A being derived from a first frame of the noninterlaced television signal and field B being derived from a nearby, adjacent in time, second frame. Field A, for example, will contain the odd numbered lines 1, 3, 5, . . . n, . . . 593, 595, . . . , where n is an odd integer, whereas field B will contain the even numbered lines 2, 4, 6, . . . n+1, . . . 594, 596. . . The recorded pixel resolution in each longitudinal segment is, for example, one-half or a lesser fraction of the pixel resolution of the original picture scene.

FIG. 12 illustrates a record/playback system 120, embodying an aspect of the invention, that may be used to record or playback a magnetic tape formatted in accordance with the format illustrated in FIG. 11. In the record mode of operation, for example, a noninterlaced video signal $V_{PR}$ is coupled to a terminal 130. Video signal $V_{PR}$ may be developed, in a conventional manner, by a progressively scanned camera system to develop, illustratively, 625 noninterlaced video lines per picture frame, at a frame repetition rate of 50 frames per second. Thus, the total number of video lines per frame of noninterlaced video signal $V_{PR}$ is similar to that in a frame of video lines for the PAL standard. However, because video signal $V_{PR}$ is noninterlaced, the frame rate, $f_V$, is at twice that of the PAL standard, whereas the line rate is $2f_H$, also twice the line rate $f_H$ of the PAL standard.

Video signal $V_{PR}$ may be either analog or digital in form, be either a monochrome or a color signal, and if a color signal, may be in either composite or component form. Furthemore, if video signal $V_{PR}$ is in component form, the components may be time-multiplexed in a single channel, such as in a MAC format, or may be in separate channel component form, where, for each longitudinal segment, separate transducers are assigned to each of the Y, I and Q component signals, in a scanner arrangement similar to that of FIG. 3. If video signal $V_{PR}$ is of the separate channel component form, than the processing stages shown in FIG. 12 are duplicated in each component channel.

In the record mode of record/playback system 120 of FIG. 12, the arms of record/playback switches RP1 and RP2 make contact with their respective record terminals R. Noninterlaced video signal $V_{PS}$ is passed through to a terminal 128.

Figure 13:
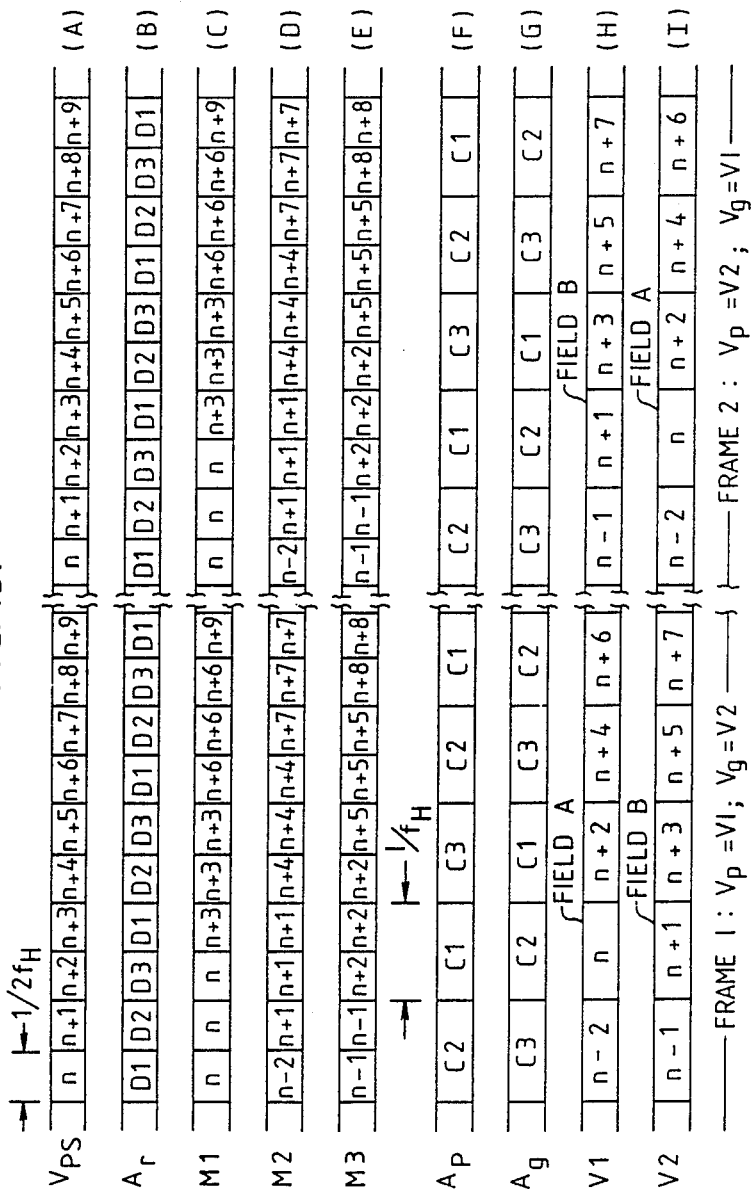

FIG. 13A illustrates the video line number sequence for noninterlaced video signal $V_{PS}$, beginning with an arbitrary video line number n which is the same line number associated with the odd integer line number n in FIG. 11. Because of the noninterlaced nature of video signal $V_{PS}$, the duration of a given video line is $\frac{1}{2}f_H$.

Noninterlaced video signal $V_{PS}$ is applied to the pole of a single-pole, triple-throw switch S1, clocked in a modulo-3 manner by a clock signal $2f_H$,ck, where the clock rate of $2f_H$, ck equals $2f_H$. FIG. 13A illustrates the contact dwell positions and durations of arm $A_r$ of modulo-3 switch S1, referenced to the video line number of the video signal $V_{PS}$ being developed at terminal 128. Thus, for example, when video line n appears at terminal 128, arm $A_r$ is in contact with terminal D1; when video line n+1 appears at terminal 128, arm $A_r$ is in contact with terminal D2; and when video line n+2 appears at terminal 128, arm $A_r$ is in contact with terminal D3. This contact sequence repeats on a modulo-3 basis.

Contacts D1-D3 are coupled to respective first ends of memories M1-M3, each memory having a memory capacity for storing a line's worth of pixels in accordance with a given desired pixel resolution. The respective other ends of memories M1-M3 are coupled to respective contacts C1-C3 of a double-pole switch S2 that includes an arm $A_p$ coupled to a pole P and an arm $A_q$ coupled to a pole Q. The arms of switch S2 are rotated in a counterclockwise direction in a modulo-3 manner by means of the clock signal $f_H$,ck provided by timing unit 122.

A double-pole, double-throw switch S3 has a pole R coupled to pole P of switch S2 and a pole S coupled to pole Q of switch S2. The arms of switch S3 cycle between their solid line contact positions and dotted line contact positions at the frame rate of noninterlaced video signal $V_{PS}$ in accordance with the clock $f_V$,ck. Thus, for example, during the appearance of the video lines of Frame 1 of noninterlaced video signal $V_{PS}$, the arms of switch S3 are in their solid line contact position;

whereas in the next frame, Frame 2, the arms are in their dotted line contact position. Therefore, during Frame 1, the video signal V1, developed at contact terminal B1 of switch S3, equals video signal $V_p$ developed at pole P of switch S2, and video signal V2, developed at contact terminal B2, equals video signal $V_q$ developed at pole Q of switch S2. The opposite situation holds true during the next frame, Frame 2.

Each of memories M1–M3 may be organized as a first-in-first-out (FIFO) memory. Each memory is capable of either-direction signal flow with respect to input/output functioning, depending upon the particular internal memory read/write clocking configuration. For example, each of the memories may comprise two parallel delay lines operated in a ping-pong manner between read and write functions by means of multiplexer steering stages coupled at both ends of each delay line. In the record mode of operation of the system of FIG. 12, the ends of memories M1–M3 coupled to respective terminals D1–D3 function as signal inputs, whereas the other ends of the memories coupled to respective terminals C1–C3 serve as memory outputs.

To write signal samples into memories M1–M3, a timing unit 122 provides a write clock WR1,ck to memory M1, a write clock WR2,ck to memory M2 and a write clock WR3,ck to memory M3. To read signal samples out of memories M1–M3, timing until 122 provides a read clock R1,ck to memory M1, a read clock R2,ck to memory M2 and a read clock R3,ck to memory M3. The noninterlaced video signal $V_{PS}$ developed at terminal 128 is coupled in the record mode of operation, to timing unit 122 to synchronize the generation of the write and read clocks to the sequence of video lines 1, 2, 3 ... n, ... of noninterlaced video signal $V_{PS}$, and to synchronize in frequency and phase the $2f_H$,ck signal, and $f_H$,ck signal and an $f_V$,ck signal to the horizontal and vertical blanking intervals associated with noninterlaced video signal $V_{PS}$.

FIGS. 13C–13E illustrate the contents of memories M1–M3 as a function of the video line number in noninterlaced video signal $V_{PS}$. When line n of video signal $V_{PS}$ appears at terminal 128 and arm $A_r$ of switch S1 dwells at contact D1, line n is written into memory M1. Line n remains in memory M1 for the next two noninterlaced lines, when arm $A_r$ sequentially dwells at contact terminals D2 and D3. When line n+1 of video signal $V_{PS}$ appears at terminal 128, arm $A_r$ dwells at contact terminal D2, and line n+1 is written into memory M2 by its respective write clock. Line n+1 remains in memory for the next two noninterlaced lines, as arm $A_r$ sequentially dwells at contact terminals D3 and D1. When line n+2 of video signal $V_{PS}$ appears at terminal 128, arm $A_r$ dwells at contact terminal D3, and line n+2 is written into memory M3 by its respective write clock. Line n+2 remains in memory M3 for the next two noninterlaced lines, when arm $A_r$ sequentially dwells at contact terminals D1 and D2. The modulo-3 cycling of switch S1 repeats, with line n+3 being written into memory M1, when arm $A_r$ dwells at contact terminal D1.

The signals stored in memories M1–M3 are sequentially read-out of the memories in coordination with the rotation of arms $A_p$ and $A_q$ between contacts C1–C3 of switch S2. The read-out rate from each memory is half that of the write-in rate, and a line's worth of memory is read-out in an interval $1/f_H$, an interval that equals the dwell time at each of contact terminals C1–C3 of each arm, $A_p$ and $A_q$, as indicated in FIGS. 13F and 13G.

In the synchronized read-out of memories M1–M3, stored line n in memory M1 and stored line n+1 in memory M2 are read out by their respective read clocks when arm $A_p$ dwells at contact terminal C1 and arm $A_q$ dwells at contact terminal C2, as indicated in FIGS. 13F–13I. For proper read-out, the synchronized operation is such that the dwell times at contacts C1 and C2, for reading out stored lines n and n+1, occur during the sequential appearance at terminal 128 of lines n+2 and n+3 of noninterlaced video signal $V_{PS}$ of FIG. 13A.

In the next sequential arm position of switch S2, arm $A_p$ dewells at contact terminal C3 and arm $A_q$ dwells at contact terminal C1. In this contact position, stored line n+2 is read out of memory M3 and stored line n+3 is read out of memory M1. In the final sequential contact position of switch S2, for a given modulo-3 cycle of operation, arm $A_p$ dwells at contact terminal C2 and arm $A_q$ dwells at contact terminal C3. Stored line n+4 is thereby read out of memory M2 and stored line n+5 is read out of memory M3.

As a result of the above described synchronous operation of switches S1–S3 and memories M1–M3, noninterlaced video signal $V_{PS}$ is converted into two separated, interlaced video signals V1 and V2. In Frame 1 of noninterlaced video signal $V_{PS}$, interlaced video signal V1 contains the odd numbered lines of the frame, namely, Field A, and interlaced video signal V2 contains the even numbered lines, namely, Field B. For Frame 2 of noninterlaced video $V_{PS}$, when the arms of switch S3 are in the dotted line contac positions shown in FIG. 12, interlaced video signal V1 contains the video lines of Field B and interlaced video signal V2 contains the lines of Field A.

Interlaced video signal V1 is applied to a record/playback electronics stage 126, and video signal V2 is applied to a record/playback electronics stage 127, both operated in the record mode, to develop interlaced video signal $V_{i1}$ and interlaced video signal $V_{i2}$, respectively. Video signals $V_{i1}$ and $V_{i2}$ are properly conditioned for recording onto respective longitudinal segments 1 and 2 of the magnetic tape of FIG. 11 by means of a scanner apparatus comprising respective scanner transducer stages 123 and 124.

The construction of scanner apparatus 129 is similar to that of the scanner apparatus illustrated in FIG. 3, with the lower level transducers $Y_1$, $Y_3$, $I_1$, $Q_1$ being associated with transducer stage 123 of FIG. 12 and the upper level transducers, $Y_2$, $Y_4$, $I_2$, $Q_2$ being associated with transducer stage 124. The tape wrap angle for scanner apparatus 129 may be similar to the nearly 360° wrap angle, omega-wrap shown in FIG. 3 or may be a complete 360° wrap angle that is provided by an alpha-wrap configuration.

Bidirectional flow of control signals is provided between timing element 122 of FIG. 12 and a scanner and capstan servo control stage 125 that controls the recording and playback of cue and headwheel control track pulses that may be associated in a conventional manner with scanner apparatus 129, the tracks of which are not illustrated in FIG. 11. Also not illustrated in FIG. 11 are any separate audio tracks, if used.

To replay or playback the noninterlaced video signal $V_{PS}$ that is recorded on the magnetic tape of FIG. 11, record/playback system 120 of FIG. 12 is operated in the playback mode with the arms of switches RP1 and RP2 making contact with their respective playback terminals PB. The heads of transducer stages 123 and 124 of scanner apparatus 129 pick-up the signal in the recorded tracks of each of their respective longitudinal segments 1 and 2 to produce a signal flow from scanner apparatus 129 to terminal 128 that is essentially the inverse of the signal flow described when record/playback system 120 was in the record mode. The synchronized operation of swithches S1–S3 and memories M1–M3 is essentially the same in the playback mode as in the previously described record mode and thus a description of the operation will not be repeated.

Interlaced video signal $V_{i1}$ and $V_{i2}$, sensed from their respective longitudinal segment tracks by transducer stages 123 and 124, are combined into sequential noninterlaced video lines of a noninterlaced reconstructed video signal $V_{PS}$ that appears at terminal 128. Vertical and horizontal synchronization components are inserted into the noninterlaced video signal developed at terminal 128 by a sync generator 121 that receives vertical and horizontal timing information from timing unit 122, in accordance with the control track and/or cue track information provided by control stage 125. In this manner a reconstructed noninterlaced video signal $V_{PS}$ with full horizontal and vertical synchronization information is developed by record/playback system 120 at the now output signal line 130 from the recorded tracks of both longitudinal segments 1 and 2 in FIG. 11.

When a portable unit is used to replay the recorded magnetic tape of FIG. 11, a record/playback system may be used that has a scanner apparatus that is capable of and scans the tracks in only one of the longitudinal segments, such as Longitudinal Segment 1 of FIG. 11. The scanner apparatus in the portable playback unit may be equipped with a lesser number of transducers that is required to playback only one of the longitudinal segments in a scanner transducer arrangement similar to that illustrated in FIG. 6. The playback unit will provide an interlaced video signal such as interlaced video signal V1 of FIG. 12, which may then be applied directly to a sync generator for insertion of synchronization information to develop an interlaced playback television signal. The interlaced playback television signal contains interlaced video lines that are representative of the entire area of the picture scene contained in the recorded noninterlaced video signal, as represented by the totality of all the tracks in both segments of the magnetic tape of FIG. 11.

The playback unit, therefore, advantageously provides a ready conversion from a progressively scanned television format to an interlaced scan television format without the use of field store sized memories. As a trade off, the resolution of the interlaced video signal, provided when playing back only one longitudinal segment of the magnetic tape of FIG. 11, is a coarser one, since the resolution is one-half the pixel resolution of the original noninterlaced video signal, in the vertical direction.

What is claimed is:

1. A recording system for recording on a magnetic tape a digital television signal containing a picture scene made up of pixels of information, comprising:
   a plurality of transducers disposed to scan a plurality of helical tracks on said magnetic tape in a plurality of longitudinal tape segments which divide the width of said tape along its length;
   a source of said television signal;
   a plurality of controllable switches coupled to said source for directing respective ones of said pixels to respective ones of said plurality of transducers through respective ones of said switches; and
   a control circuit coupled to said plurality of controllable switches and responsive to synchronizing information of said television signal for synchronously controlling the switching operation of said plurality of switches to record, in each of said plurality of longitudinal tape segments, recorded video lines that provide in each tape segment a recorded picture scene representative of the full picture scene contained in said television signal and made up of a plurality of recorded pixels representing pixels of the picture scene contained in said television signal that are located at points distributed over the entire area of the picture scene contained in said television signal, with the recorded pixel resolution being a lesser fraction of the pixel resolution of said television signal,
   Wherein said control circuit is responsive to horizontal line synchronizing information of said television signal for synchronously controlling the switching operation of said plurality of switches to record pixels from each horizontal video line of said television signal in each of said plurality of longitudinal tape segments in a manner that reduces the number of pixels recorded in each video line relative to the number of pixels availabe in the corresponding video line of said television signal.

2. The system of claim 1 wherein the digital television signal is made up of pixels relating to each of a plurality of signal components, each signal component being directed to a respective one of said plurality of transducers through a respective one of said plurality of switches, and wherein said control circuit includes a plurality of modulo counters for controlling the switching operation of said respective ones of said switches in accordance with the sampling rate of the signal component associated therewith, each modulo counter being driven by a sample rate clock of the associated signal component.

3. The recording system of claim 1 wherein said lesser fraction equals 1/N, where N equals the number of said plurality of longitudinal tape segments.

4. A recording system for recording on a magnetic tape a digital television signal containing a picture scene made up of pixels of information, comprising:
   means including a scanner for scanning said magnetic tape;
   a plurality of transducers disposed on said scanner to scan a plurality of helical tracks on said magnetic tape in a plurality of longitudinal tape segments which divide the width of said tape along its length, such that a first given transducer, associated with a first given longitudinal tape segment, is disposed to scan a helical track in that given tape segment simultaneously with the scanning of a helical track by a second given transducer associated with a second given tape segment, and wherein each of the two given transducers is further disposed to scan only those helical tracks located in its associated tape segment;
   a source of said television signal;
   a plurality of controllable switches coupled to said source for directing respective ones of said pixels to respective ones of said plurality of transducers; and
   a control circuit coupled to said plurality of controllable switches and responsive to synchronizing information of said television signal for synchronously controlling the switching operation of said plurality of switches to record, in each of said plurality of longitudinal tape segments, recorded video lines that provide in each tape segment a recorded picture scene representative of the entire area of the picture scene contained in said television signal and made up of a plurality of recorded pixels having a pixel resolution that is a lesser fraction of the pixel resolution of the picture scene contained in said television signal.

5. A compatible playback tape machine for generating a playback television signal from a recorded magnetic tape of a digital television signal format compatible containing a picture scene made up of pixels of information, wherein said magnetic tape has recorded thereon a plurality of helical tracks in a plurality of longitudinal tape segments which divide the width of said tape along its length, such that respective ones of said pixels are recorded in respective ones of said plurality of longitudinal tape segments in a manner that provides in each of said plurality of longitudinal tape segments, recorded video lines that provide in each tape segment a recorded picture scene representative of the entire area of the picture scene contained in said digital television signal and made up of a plurality of recorded pixels having a recorded pixel resolution that is a lesser fraction of the pixel resolution of the picture scene contained in said digital television signal, said playback tape machine including:

means including a scanner for scanning said recorded magnetic tape;

means including a transducer arrangement disposed on said scanner for transducing the recorded tracks in a given one but not all of said plurality of longitudinal tape segments, to obtain transduced, recorded video lines only from said given one longitudinal tape segment, such that the pixels contained in said transduced, recorded video lines correspond only to those pixels of the digital television signal that are recorded in said given one segment; and means coupled to said transducer arrangement and responsive to said transduced video lines for generating said playback television signal that contains a playback television picture scene representative of said entire area of the picture scene contained in said digital television signal but having a pixel resolution of said lesser fraction.

6. A playback tape machine for generating a playback television signal from a recorded magnetic tape of a digital television signal containing a picture scene made up of pixels of information, wherein said magnetic tape has recorded thereon a plurality of helical tracks in a plurality of longitudinal tape segments which divide the width of said tape along its length, such that pixels from a given video line of said digital television signal are recorded in each of said plurality of longitudinal tape segments in a manner that provides in each tape segment recorded video lines that contain a recorded picture scene representative of the entire area of the picture scene contained in said digital television signal and made up of a plurality of recorded pixels having a recorded pixel resolution that is a lesser fraction of the pixel resolution of the picture scene contained in said digital television signal, said playback tape machine including:

means including a scanner for scanning said recorded magnetic tape;

means including a transducer arrangement disposed on said scanner for transducing recorded tracks in a given one but not all of said plurality of longitudinal tape segments, to obtain transduced, recorded video lines only from said given one longitudinal tape segment, such that the pixels contained in a given transduced video line correspond only to those pixels from said given video line of said digital television signal that are recorded in said given one longitudinal segment; and means coupled to said transducer arrangement and responsive to said transduced, recorded video lines for generating said playback television signal that contains a playback television picture scene representative of said entire area of the picture scene contained in said digital television signal but having a pixel resolution of said lesser fraction.

7. A playback tape machine for generating a playback television signal from a recorded magnetic tape of a digital television signal containing a picture scene made up of pixels of information, wherein said magnetic tape has recorded thereon a plurality of helical tracks in a plurality of longitudinal tape segments which divide the width of said tape along its length, such that respective ones of said pixels are recorded in respective ones of said plurality of longitudinal tape segments in a manner that provides in each tape segment a recorded picture scene representative of the entire area of the picture scene contained in said digital television signal an made up of a plurality of recorded pixels having a recorded pixel resolution that is a lesser fraction of the pixel resolution of the picture scene contained in said digital television signal, said playback tape machine, including:

means including a scanner for scanning said recorded magnetic tape;

means including a plurality of transducers disposed on said scanner for transducing the recorded video lines in the recorded tracks in each of said plurality of longitudinal tape segments, such that a first given transducer, associated with a first given longitudinal tape segment, is disposed to scan a helical track in that given tape segment simultaneously with the scanning of a helical track by a second given transducer associated with a second given tape segment, and wherein each of the two given transducers is further disposed to scan only those helical tracks located in its associated tape segment; and means coupled to said transducer arrangement and responsive to the transduced, recorded video lines for generating said playback television signal that contains a playback television picture scene representative of said entire area of the picture scene contained in said digital television signal and at the same pixel resolution.

8. A recording system for recording on a magnetic tape video lines of a television signal containing a picture scene made up of pixels of information, comprising:

a plurality of transducers disposed to scan a plurality of helical tracks on said magnetic tape in a plurality of longitudinal tape segments which divide the width of said tape along its length;

a source of said television signal;

means including a plurality of controllable switches coupled to said source for directing respective ones of said video lines to respective ones of said plurality of transducers; and a control circuit coupled to said plurality of controllable switches and responsive to synchronizing information of said television signal for synchronously controlling the switching operation of said plurality of switches to record, in each of said plurality of longitudinal tape segments, recorded video lines that provide in each tape segment a recorded picture scene representative of the entire area of the picture scene contained in said television signal and having a pixel resolution that is a lesser fraction of the pixel resolution of the picture scene contained in said television signal;

wherein said control circuit is responsive to line synchronizing information of said television signal for synchronously controlling the switching operation of said plurality of switches to record in sequence video lines of said television signal that are next adjacent in time in corresponding, adjacently located ones of said plurality of longitudinal tape segments.

9. A playback tape machine for generating a playback signal from a recorded magnetic tape of video lines of an input television signal containing a picture scene made up of pixels of information, wherein said magnetic tape has recorded thereon a plurality of helical tracks in a plurality of longitudinal tape segments which divide the width of said tape along its length, such taht respective ones of said pixels are recorded in respective ones of said plurality of longitudinal tape segments in a manner that provides in each of said plurality of longitudinal tape segments, recorded video lines that provide in each tape segment a recorded picture scene representative of the entire area of the picture scene contained in said input television signal and having a recorded pixel resolution that is a lesser fraction of the pixel resolution of the picture scene contained in said input television signal, wherein two video lines of said input television signal that are next adjacent in time are recorded in sequence in corresponding, adjacently located ones of said plurality of longitudinal tape segments, said playback tape machine including:

means including a scanner for scanning said recorded magnetic tape;

means including a transducer arrangement located on said scanner for transducing the recorded video lines in the recorded tracks in one but not all of said plurality of longitudinal tape segments;

means coupled to said transducer arrangement for generating a sequence of transduced video lines where two next adjacent lines of said sequence of transduced video lines correspond to two video lines of said input television signal that are time separated by an intervening video line; and means coupled to said sequence generating means for generating said playback television signal that contains a playback television picture scene representative of said entire area of the picture scene contained in said input television signal but having a pixel resolution of said lesser fraction.

10. A playback tape machine for generating a playback signal from a recorded magnetic tape of video lines of an input television signal containing a picture scene made up of pixels of information, wherein said magnetic tape has recorded thereon a plurality of helical tracks in a plurality of longitudinal tape segments which divide the width of said tape along its length, such that respective ones of said pixels are recorded in respective ones of said plurality of longitudinal tape segments in a manner that provides in each of said plurality of longitudinal tape segments, recorded video lines that provide in each tape segment a recorded picture scene representative of the entire area of the picture scene contained in said input television signal and having a recorded pixel resolution that is a lesser fraction of the pixel resolution of the picture scene contained in said input television signal, wherein two video lines of said input television signal that are next adjacent in time are recorded in sequence in corresponding, adjacently located ones of said plurality of longitudinal tape segments, said playback tape machine including:

means including a scanner for scanning said recorded magnetic tape;

means including a transducer arrangement located on said scanner for transducing the recorded video lines in the recorded tracks in each of said plurality of longitudinal tape segments, to generate a plurality of transduced video lines that include transduced video lines corresponding to video lines of said input television signal that are next adjacent in time; and means coupled to said transducer arrangement and responsive to said plurality of transduced video lines for generating said playback television signal that contains a playback television picture scene representative of said entire area of the picture scene contained in said input television signal and at the same pixel resolution.

11. A recording system for recording on a magnetic tape noninterlaced video lines of a progressively scanned television signal, comprising:

a plurality of transducers disposed to scan a plurality of helical tracks on said magnetic tape in a plurality of longitudinal tape segments which divide the width of said tape along its length;

a source of said progressively scanned television signal, wherein a frame of said progressively scanned television signal contains a first plurality of said noninterlaced video lines associated with a first field in said frame and a second plurality of said noninterlaced video lines associated with a second field that forms an interlaced line pattern with the first field;

means including a plurality of controllable switches coupled to said source for directing respective portions of said progressively scanned television signal to respective ones of said plurality of transducers; and a control circuit coupled to said plurality of controllable switches and responsive to synchronizing information of said progressively scanned television signal for synchronously controlling the switching operation of said plurality of switches to record said said progressively scanned television signal in corresponding ones of said plurality of longitudinal tape segments in a manner that produces in a given segment a recorded television signal, such that a recorded frame of said recorded television signal contains first and second recorded fields that respectively correspond to said first and second fields of said progressively scanned television signal.

12. A recording system according to claim 12 wherein said first and second recorded fields correspond to respective first and second interlaced fields of said progressively scanned television signal that are obtained from different frames of said progressively scanned television signal.

13. A playback tape machine for generating a playback television signal from a recored magnetic tape of noninterlaced video lines of a progressively scanned television signal, wherein said magnetic tape has recorded thereon a plurality of helical tracks in a plurality of longitudinal tape segments which divide the width of said tape along its length, such that a given frame of said progressively scanned television signal is recorded as a plurality of fields that are recorded in different ones of said plurality of longitudinal tape segments to provide in a given segment a plurality of recorded fields, such that first and second recorded fields in said given segment respectively correspond to first and second fields of said progressively scanned television signal that form an interlaced line pattern with each other, said playback tape machine including:

a scanner for scanning said recorded magnetic tape;

means including a transducer arrangement located on said scanner for transducing the recorded tracks in said given segment to obtain transduced fields corresponding to fields of said progressively scanned television signal that form interlaced line patterns with one another; and means coupled to said transducer arrangement and responsive to the transduced fields for generating said playback television signal as an interlaced playback television signal.

14. A playback tape machine for generating a playback television signal from a recorded magnetic tape of noninterlaced video lines of a progressively scanned television signal, wherein said magnetic tape has recorded thereon a plurality of helical tracks in a plurality of longitudinal tape segments which divide the width of said tape along its length, such that a given frame of said progressively scanned television signal is recorded as a plurality of fields that are recorded in different ones of said plurality of longitudinal tape segments to provide in a given segment a plurality of recorded fields, such that first and second recorded fields in said given segment respectively correspond to first and second fields of said progressively scanned television signal that form an interlaced line pattern with each other, said playback tape machine including:

a scanner for scanning said recorded magnetic tape;

means including a transducer arrangement located on said scanner for transducing the recorded tracks in each of said plurality of longitudinal tape segments to obtain a plurality of transduced fields that correspond to fields of said progressively scanned television signal that form interlaced line patterns with one another; and means coupled to said transducer arrangement and responsive to said plurality of transduced fields for generating said playback television signal as a progressively scanned playback television signal of noninterlaced video lines.

* * * * *

UNITED STATES PATENT AND TRADEMARK OFFICE
CERTIFICATE OF CORRECTION

PATENT NO. : 4,843,485

DATED : June 27, 1989

INVENTOR(S): Glenn Arthur Reitmeier

It is certified that error appears in the above-identified patent and that said Letters Patent is hereby corrected as shown below:

Column 1, after "MULTIPLE FORMAT DIGITAL VIDEO TAPE RECORD AND REPLAY SYSTEM" and before "BACKGROUND OF THE INVENTION" insert --This is a continuation-in-part of Application Serial No. 564,832, filed December 23, 1983, now abandoned, a division of Application Serial No. 311,796, filed October 15, 1981, now abandoned.--

Column 1, line 53: "diveded" should read --divided--.

Column 4, line 26: "coulb" should read --could--.

Column 5, line 39: "replyed" should read --replayed--.

Column 7, line 49: "syncronous" should read --synchronous--.

Column 12, line 30: "contac" should read --contact--.

Column 17, line 24: "taht" should read --that--.

Column 18, line 61: "12" (second occurrence) should read --11--.

Column 18, line 68: "recored" should read --recorded--.

On the title sheet, section (63) should read --Continuation-in-part of Ser. No. 564,832, Dec. 23, 1983, abandoned,

UNITED STATES PATENT AND TRADEMARK OFFICE
CERTIFICATE OF CORRECTION

PATENT NO. : 4,843,485
DATED : June 27, 1989
INVENTOR(S) : Glenn Arthur Reitmeier Page 2 of 2

It is certified that error appears in the above-identified patent and that said Letters Patent is hereby corrected as shown below:

which is a division of Ser. No. 311,796, Oct. 15, 1981, abandoned.--

Signed and Sealed this

Twenty-eighth Day of August, 1990

Attest:

HARRY F. MANBECK, JR.

*Attesting Officer*   *Commissioner of Patents and Trademarks*